Nov. 1, 1955   H. F. CLARK   2,722,644
STARTING AND OVERLOAD CONTROL FOR SINGLE PHASE MOTORS
Filed Jan. 29, 1954
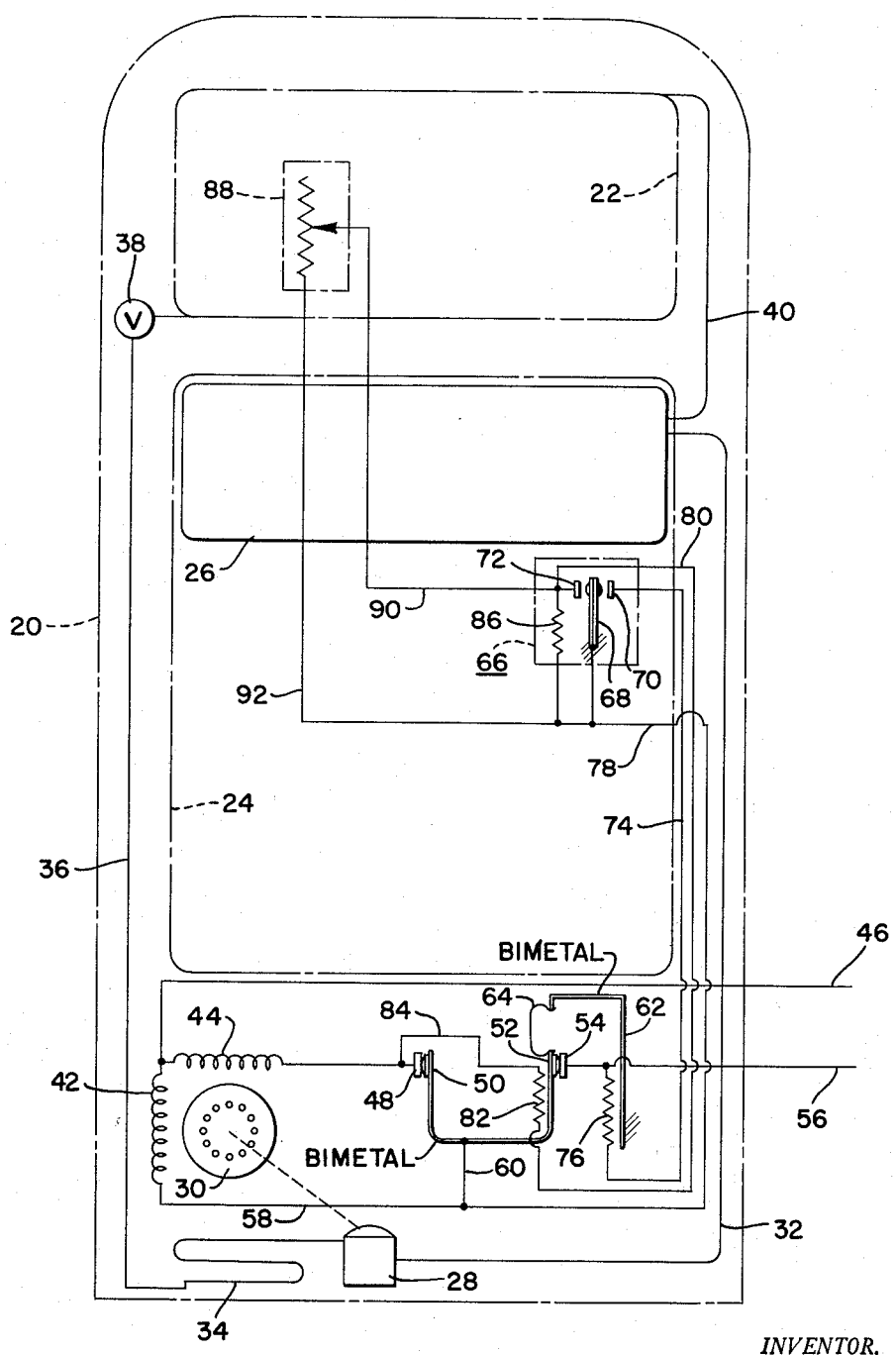
INVENTOR.
Harry F. Clark
BY R K Candor
His Attorney

United States Patent Office 2,722,644
Patented Nov. 1, 1955

2,722,644

STARTING AND OVERLOAD CONTROL FOR SINGLE PHASE MOTORS

Harry F. Clark, Dayton, Ohio, assignor to General Motors Corporation, Detroit, Mich., a corporation of Delaware Application January 29, 1954, Serial No. 407,134

9 Claims. (Cl. 318—221)

This invention relates to electrical apparatus and more particularly to control systems in which the overload protector is provided with an additional temperature control.

Normally temperature or other condition responsive controls are either directly or through relays connected to control the main circuit. It is customary to provide some form of motor or circuit protection for controlling the main circuit independently of the temperature control.

It is an object of my invention to consolidate the temperature or other condition responsive control with the overload protector so that only one set of main circuit controls are required.

It is another object of my invention to provide an arrangement wherein the temperature or other condition responsive control is connected to operate the overload protector as a relay.

It is another object of my invention to provide a remote adjustment for a thermostat or other condition responsive control.

These and other objects are attained in the form shown which includes a refrigerating system controlled by a thermal overload protector. This thermal overload protector includes a thermal compensator for ambient temperatures. A double throw temperature responsive control is provided which alternately energizes heating circuits which either heat the thermal overload protector to stop the operation of the refrigerating system or heat the temperature compensator to close the protector and operate the refrigerating system. The control may be provided with an anticipating heater whose heating rate may be adjusted through a remotely located variable resistance connected either in parallel or series with it.

Further objects and advantages of the present invention will be apparent from the following description, reference being had to the accompanying drawing wherein a preferred form of the invention is clearly shown.

In the drawing, the figure is a diagrammatic representation of a refrigerating system embodying one form of my invention.

Referring now to the drawing there is shown in dot and dash outline a two compartment domestic electric refrigerator 20 having an upper freezing compartment 22 and a lower food storage compartment 24 normally maintained at refrigerating temperatures above freezing. The freezing compartment is enclosed within a freezing unit coextensive with the walls of the compartment 22. The food compartment 24 is refrigerated by a vertical plate 2. The system includes a compressor 28 driven by a split phase electric motor 30. The compressor 28 withdraws evaporated refrigerant from the vertical plate 26 in the food compartment 24 through the suction conduit 32 and forwards this compressed refrigerant to a condenser 34 where it is liquefied and conducted through the conduit 36 under the control of a suitable refrigerant flow control valve 38 to the freezing unit for the compartment 22. Any surplus liquid refrigerant in the freezing compartment evaporator 22 as well as all of the cold vapor is withdrawn therefrom and conducted to the vertical plate evaporator 26 through the conduit 40. The vertical plate evaporator 26 delivers its evaporated refrigerant to the suction conduit 32.

The split phase motor 30 includes a main winding 42 and a phase winding 44 having their common junction connected to the supply conductor 46. The second terminal of the phase winding 44 is connected to a stationary starting contact 48 adapted to be contacted by a movable contact provided upon the adjacent end 50 of a U-shaped bimetal member. This U-shaped bimetal member is provided with a second end or leg 52 having and operating a movable contact into and out of a normally stationary contact 54. This normally stationary contact 54 is connected to the second supply conductor 56. The second terminal of the main winding 42 is connected by the conductors 58 and 60 to the U-shaped bimetal between the legs 50 and 52. The contact carried by the end or leg 52 and the contact 54 form the overload protector switch contacts which connect in series with both windings of the motor 30. The contact 48 and the adjacent contact on the end or leg 50 constitute the starting contacts which are connected in series with the phase winding 44.

The flow of current from the phase winding 44 through the end or leg 50 gradually heats the bimetal in the leg 50 and at the end of the starting period causes it to bow away from the contact 48 and open the phase winding circuit at the proper time. The combined flow of both the main and phase winding current through the end or leg portion 52 to the overload protector contact 54 when excessive, will cause the leg 52 to bow away from the contact 54 to disconnect the motor 30 from the supply conductor 56. The cooling of the leg portion 52 will straighten it and return it to engagement with the contact 54 to reconnect with the supply conductor 56.

In order that the overload protector provides substantially the same tripping values under different room temperatures and different environment temperatures it is provided with a hooked shaped temperature compensating bimetal 62 which is connected by a C-shaped toggle spring 64 with the end or leg 52 adjacent the contact. As the increase in environment temperature tends to cause the leg 52 to bow away from the contact 54, the compensating bimetal 62 is similarly affected by the rise in temperature to move in the same direction to increase the angularity of the C-shaped toggle spring tending to provide a component to hold the bimetal arm 52 toward the stationary protector contact 54. The U-shaped bimetal as well as the compensating bimetal 62 are provided with their high expanding surface on their outer or right sides. The toggle spring 64 tends to hold the leg 52 in either the open or the closed position and insures movement from one position to the other with a snap-action. The portion of the control just described may be like that disclosed in the Clark Patent 2,593,268.

According to my invention I use the overload protector system as a relay which is controlled by a double throw condition responsive control such as a double throw thermostat. For this purpose within the food compartment 24 I provide a double throw thermostat control 66 which includes an actuating thermostat bimetal 68 provided with a set of double throw switch contacts and arranged so that its high expanding side is on its left face. Cooperating with the double throw contacts of the bimetal 68 are the warm stationary contact 70 and the cold stationary contact 72. The warm stationary contact 70 is connected by a conductor 74 with one end of an electric circuit closing heater 76, located in heat exchange relation with the compensating bimetal 62. The second terminal of the circuit closing heater 76 is connected to the supply conductor 56. The bimetal 68 is connected by the conductor 78 to the conductor 58 so that when the contacts of the bimetal 68 make contact with the contacts 70, the heater 76 is connected in a shunt circuit around the overload protector contacts. Thus the circuit closing heater 76 can be energized to close the protector contacts but the heater 76 will be deenergized as soon and as long as the protector contacts 52, 54 are closed.

The cold stationary contact 72 is connected by the conductor 80 to an electric circuit opening heater 82 located aside of the end or leg 52 within the U-shaped bimetal. It is located in heat transfer relationship with the end or leg 52 so that when it is energized it will heat the leg 52 and cause it to move away from the contact 54 to open the protector contacts 52, 54 to deenergize the motor circuit. The second terminal of the circuit opening heater 82 is connected by the conductor 84 to the contact 48 and the adjacent terminal of the phase winding 44. The bimetal 68 is arranged so that its high expanding surface is on the left face so that it will bow into contact with the contact 70 upon a rise in temperature and will bow into contact with the contact 72 upon a fall in temperature. The heating circuit for the leg 52, which includes the conductor 84, the circuit opening heater 82, the conductor 80, the contact 72, the bimetal 68, the conductors 78 and 60, is connected in series with the overload protector contacts so that it can only be energized when the protector contacts are closed and when the double throw contacts engage the contact 72. This heating circuit is connected across the non-connected terminals of the main winding 42 and the phase winding 44 so that there will be a potential difference between the two ends of this circuit.

The thermostat 66 is also provided with a delaying heater 86 having a high electrical resistance. This delaying heater 86 is of course shunted out when the double throw contacts are in engagement with the cold contact 72 since it is connected in shunt with these contacts. To obtain a remote temperature adjustment a variable resistance 88 may be provided at any remote convenient point. The movable top of this variable resistance is connected by the conductor 90 to the conductor 80 while the resistance is connected by the conductor 92 to the conductor 78 so that the variable resistance is connected in shunt with the delaying heater 86. Therefore the voltage applied to the delaying heater 86 is varied by varying the resistance of the variable resistance 88. The varying of the voltage applied to the delaying heater 86 will vary the amount of heat liberated within the control 66 and applied to the bimetal 68. This delaying heater 86 tends to increase the time that the double throw contacts are out of contact with the cold and warm contacts 72 and 70. This delaying heater 86 is not energized when the overload protector contacts are open so that it does not interfere with the movement of the double throw contacts into contact with the overload contact 70. The heater 86 is only energized when the overload protector contacts are closed and the double throw contacts are not in engagement with the contact 72.

In operation, when the food compartment 24 becomes too warm, the thermostat bimetal 68 will move to the right carrying the double throw contacts into engagement with the contact 70. The overload protector contacts are in the open position prior to this time. The engaging of the contact 70 causes current to flow from the supply conductor 56 through the heater 76, the conductor 74, the contact 70, the bimetal 68, the conductor 78 through the main winding 42 to the other supply conductor 46. This flow of current will cause the circuit closing heater 76 to heat the compensating bimetal 62 until it moves to the left and tilts the C-shaped toggle spring sufficiently to move the leg 52 to the right to carry its contact into closed circuit position. This will allow current to flow from the supply conductor 46 through the phase winding 44 and the contact 48 to the leg 50 of the U-shaped bimetal while current will also flow through the main winding 42 and the conductors 58 and 60 to the U-shaped bimetal. The flow of current through both windings therefore will flow through the end or leg 52 and its contact to the overload contact 54 which connects to the supply conductor 56. When the motor 30 achieves sufficient speed the leg 50 will be self-heated sufficiently to move away from the starting contact 48 to deenergize the starting winding circuit. The motor 30 will then continue to operate upon the running winding 42 alone and will operate the refrigerating system to cool the food compartment and the freezing compartment 22.

As soon as the food compartment 24 is cooled sufficiently, the bimetal 68 will move away from the contact 70. This movement will be slowed down by the heating effect of the delaying heater 86. When the bimetal 68 is cooled sufficiently it will move the double throw contacts into engagement with the contact 72. This will shunt out the delaying heater 86 and close the heating circuit for the circuit opening heater 82. In this heating circuit, current will flow from the supply conductor 46 through the phase winding 44 to the starting contact 48 and thence through the conductor 84, the circuit opening heater 82 and through the conductor 80 to the contact 72 thence through the leg 52 and the overload protector contact 54 to the supply conductor 56. This heating circuit will cause the circuit opening heater 82 to heat the leg 52 sufficiently to cause it to move away from the protector contact 54 to deenergize the system.

The variable resistance 88 may be moved to a high value to increase the heating effect of the delaying heater 86 so as to delay the movement of the double throw contacts from the warm contact 70 to the cold contact 72. This will prolong the operating period of the refrigerating system and cause the system to continue operation until colder temperatures are reached. When the value of the variable resistance 88 is lowered the anticipating heater 86 will have a lesser heating effect which will hasten the movement of the double throw contacts from the warm contact 70 to the cold contact 72 thus shortening the operating periods of the refrigerating system and stopping the system at warmer temperatures.

The thermostat 66 may be placed at any location and may be made responsive to any condition desired. If desired it may be placed in heat exchange relationship with the evaporator 26 and may be set to operate upon a defrost cycle. It also may be placed in heat exchange relation with the freezing compartment 22 if desired. It is not necessary that the control 66 be a thermostat. This control may be any sort of a condition responsive control such as a humidistat or it may be responsive to pressure.

While the form of embodiment of the invention as herein disclosed constitutes a preferred form, it is to be understood that other forms might be adopted as may come within the scope of the claims which follow.

What is claimed is as follows:

1. A motor and control system including a split phase motor having a phase winding and a main winding, a starting control having contacts connected for controlling said phase winding, an overload protector having contacts connected for controlling with said motor, said protector including a thermal actuating element and a thermal compensating element, a double throw switch control having a movable contact connected to said main winding and high and low normally stationary contacts adapted to be contacted at high and low control values by said movable contact, a heating circuit extending in heat exchange relationship with said thermal compensating element and connecting one of said protector contacts with said high contact, and a second heating circuit extending in heat exchange relationship with said thermal actuating element connecting said phase winding and said low contact.

2. A control system including a power supply connection, an electrical unit to be controlled, a thermal overload protector having switch contacts connected for controlling said electrical unit, said protector comprising a thermal actuating means connected to said contacts to deenergize said unit upon predetermined temperature conditions and a thermal compensating means provided with an arrangement connecting to said contacts for compensating for the effect of environment temperature upon said actuating means and for biasing said contacts to energize said unit upon increasing environment temperature, a condition responsive control comprising a movable condition responsive double throw contact element electrically connected to said power supply connection and relatively stationary cooperating high and low contacts cooperating with said double throw element, a first heating circuit connected to said high contact and energized from said power supply connection by the engagement of the contact element with said high contact and extending into heat transfer relation with one of said thermal means for operating said protector contacts from a first condition to a second condition, and a second heating circuit connected to said low contact and energized from said power supply connection by the engagement of the contact element with said low contact and extending into heat transfer relation with the other of said thermal means for operating said protector contacts from the second condition to the first condition.

3. A control system including a power supply connection, an electrical unit to be controlled, a thermal overload protector having switch contacts connecting said electrical unit and said power supply connection, said protector comprising a thermal actuating means connected to said contacts to deenergize said unit upon predetermined temperature conditions and a thermal compensating means provided with an arrangement connecting to said contacts for compensating the effect of environment temperature upon said actuating means and for biasing said contacts to energize said unit upon increasing environment temperature, a condition responsive control comprising a movable condition responsive double throw contact element electrically connected to said power supply connection and relatively stationary cooperating high and low contacts cooperating with said double throw element, a first heating circuit connected to said high contact and energized from said power supply connection by the engagement of the contact element with said high contact and extending into heat transfer relation with one of said thermal means for operating said protector contacts from a first condition to a second condition, and a second heating circuit connected to said low contact and energized from said power supply connection by the engagement of the contact element with said low contact and extending into heat transfer relation with the other of said thermal means for operating said protector contacts from the second condition to the first condition, and a high value resistance connected across said contact element and one of its cooperating contacts.

4. A control system including a power supply connection, an electrical unit to be controlled, a thermal overload protector having switch contacts connecting said electrical unit and said power supply connection, said protector comprising a thermal actuating means connected to said contacts to deenergize said unit upon predetermined temperature conditions and a thermal compensating means provided with an arrangement connecting to said contacts for compensating for the effect of environment temperature upon said actuating means and for biasing said contacts to energize said unit upon increasing environment temperature, a condition responsive control comprising a movable condition responsive double throw contact element electrically connected to said power supply connection and relatively stationary cooperating high and low contacts cooperating with said double throw element, a first heating circuit connected to said high contact and energized from said power supply connection by the engagement of the contact element said high contact and extending into heat transfer relation with one of said thermal means for operating said protector contacts from a first condition to a second condition, and a second heating circuit connected to said low contact and energized from said power supply connection by the engagement of the contact element with said low contact and extending into heat transfer relation with the other of said thermal means for operating said protector contacts from the second condition to the first condition, and a high value resistance connected across said contact element and one of its cooperating contacts, and a variable resistance connected in shunt arrangement with said high value resistance.

5. A control system including a power supply connection, an electrical unit to be controlled, a thermal overload protector having switch contacts connecting said electrical unit and said supply connection, said protector comprising a thermal actuating means connected to and biasing said contacts to open position to deenergize said unit upon the attainment of predetermined temperature conditions and a thermal compensating means connected to and biasing said contacts to closed position to energize said unit upon the attainment of predetermined temperature conditions, a condition responsive control comprising a movable condition responsive double throw contact element electrically connected to said power supply connection and relatively stationary high and low contacts cooperating with said double throw element, a first heating circuit connected in shunt circuit arrangement with said protector switch contacts and in heat transfer arrangement with said thermal compensating means, the double throw contact element and one of said relatively stationary contacts of said condition responsive control being connected in series with said first heating circuit to control its energization when said protector contacts are open, a second heating circuit connected in parallel circuit relationship with said unit and in series with said protector switch contacts and the double throw contact element and the other of the contacts of said condition responsive control, said second heating circuit extending in heat transfer arrangement with said thermal actuating means.

6. A control system including a power supply connection, an electrical unit to be controlled, a thermal overload protector having switch contacts connecting said electrical unit and said supply connection, said protector comprising a thermal actuating means connected to and biasing said contacts to open position to deenergize said unit upon the attainment of predetermined temperature conditions and a thermal compensating means connected to and biasing said contacts to closed position to energize said unit upon the attainment of predetermined temperature conditions, a condition responsive control comprising a movable condition responsive double throw contact element and relatively stationary high and low contacts cooperating with said double throw element, a first heating circuit connected in shunt circuit arrangement with said protector switch contacts and in heat transfer arrangement with said thermal compensating means, the double throw contact element and one of said relatively stationary contacts of said condition responsive control being connected in series with said first heating circuit to control its energization when said protector contacts are open, a second heating circuit connected in parallel circuit relationship with said unit and in series with said protector switch contacts and the double throw contact element and the other of the contacts of said condition responsive control, said second heating circuit extending in heat transfer arrangement with said thermal actuating means, and a third heating circuit connecting said double throw contact element and one of the other contacts of said condition responsive control and extending in heat transfer relationship with said condition responsive control.

7. A control system including a power supply connection, an electrical unit to be controlled, a thermal overload protector having switch contacts connecting said electrical unit and said supply connection, said protector comprising a thermal actuating means connected to and biasing said contacts to open position to deenergize said unit upon the attainment of predetermined temperature conditions and a thermal compensating means connected to and biasing said contacts to closed position to energize said unit upon the attainment of predetermined temperature conditions, a condition responsive control comprising a movable condition responsive double throw contact element and relatively stationary high and low contacts cooperating with said double throw element, a first heating circuit connected in shunt circuit arrangement with said protector switch contacts and in heat transfer arrangement with said thermal compensating means, the double throw contact element and one of said relatively stationary contacts of said condition responsive control being connected in series with said first heating circuit to control its energization when said protector contacts are open, a second heating circuit connected in parallel circuit relationship with said unit and in series with said protector switch contacts and the double throw contact element and the other of the relatively stationary contacts of said condition responsive control, said second heating circuit extending in heat transfer arrangement with said thermal actuating means, and a third heating circuit connecting said double throw contact element and one of the other contacts of said condition responsive control and extending in heat transfer relationship with said condition responsive control, and a variable resistance connected in controlling relationship with said third heating circuit for controlling its heating effect.

8. A thermostatic control system for a split phase electric motor having main and phase windings including an electrical power supply, a thermal overload control connected to the power supply having a thermal actuating means controlling the connection and a temperature compensating means for the actuating means, a starting control including starting contacts for controlling the energization of the phase winding, a double throw thermostat having cold and warm contacts and a third contact between the cold and warm contacts and movable relative thereto, said third contact being electrically connected to said power supply, an electrical heating circuit for heating said temperature compensating means connecting the power supply to the warm contact, a second electrical heating circuit for heating said thermal actuating means connected between said cold contact and the phase winding, and an electrical resistance connecting the cold contact and said third contact.

9. A thermostatic control system for an electric motor having one terminal connected to an electrical power supply including a thermal overload control connected between the power supply and the motor having a thermal actuating means controlling the connection and a temperature compensating means for the actuating means, a double throw thermostat having cold and warm contacts and a third contact between the cold and warm contacts and movable relative thereto, said third contact being electrically connected to said power supply, a first electrical heating circuit for heating said temperature compensating means connecting the power supply to one of said contacts, a second electrical heating circuit for heating said thermal actuating means connecting to another of said contacts, and an electrical resistance connecting the remaining contact of said thermostat and said second circuit.

References Cited in the file of this patent

UNITED STATES PATENTS

| | | |
|---|---|---|
| 2,278,575 | Werner et al. | Apr. 7, 1942 |
| 2,317,630 | Menzies et al. | Apr. 27, 1943 |
| 2,418,235 | Menzies | Apr. 1, 1947 |